United States Patent
Kong et al.

(10) Patent No.: US 7,426,124 B2
(45) Date of Patent: Sep. 16, 2008

(54) DC-AC CONVERTER

(75) Inventors: Seung Kon Kong, Gyeonggi-do (KR); Tae Jin Kim, Seoul (KR); Nak Choon Choi, Gyeonggi-do (KR)

(73) Assignee: KEC Corporation (KR)

( * ) Notice: Subject to any disclaimer, the term of this patent is extended or adjusted under 35 U.S.C. 154(b) by 0 days.

(21) Appl. No.: 11/522,590

(22) Filed: Sep. 18, 2006

(65) Prior Publication Data

US 2007/0153559 A1 Jul. 5, 2007

(30) Foreign Application Priority Data

Jan. 5, 2006 (KR) ............. 10-2006-0001515

(51) Int. Cl.
*H02M 5/42* (2006.01)
(52) U.S. Cl. .................... 363/98; 363/17; 363/132
(58) Field of Classification Search .............. 363/17, 363/98, 132
See application file for complete search history.

(56) References Cited

U.S. PATENT DOCUMENTS

| | | | |
|---|---|---|---|
| 5,712,533 A * | 1/1998 | Corti .................. | 315/169.3 |
| 6,259,615 B1 | 7/2001 | Lin ..................... | 363/98 |
| 6,396,722 B2 * | 5/2002 | Lin ..................... | 363/98 |
| 6,466,076 B2 * | 10/2002 | Yoshikawa .......... | 327/382 |
| 6,930,898 B2 * | 8/2005 | Jeon et al. ........... | 363/98 |
| 7,099,168 B2 * | 8/2006 | Fukumoto ........... | 363/98 |
| 7,200,012 B1 * | 4/2007 | Hsu .................... | 363/17 |
| 7,292,463 B2 * | 11/2007 | Fukumoto ........... | 363/98 |

FOREIGN PATENT DOCUMENTS

| JP | 07-122376 | 5/1995 |
|---|---|---|
| KR | 10-2005-0107123 | 11/2005 |

* cited by examiner

*Primary Examiner*—Jessica Han
*Assistant Examiner*—Emily Pham
(74) *Attorney, Agent, or Firm*—St. Onge Steward Johnston & Reens LLC

(57) ABSTRACT

A DC-AC converter has two half-bridge circuits using an input feedback signal and an input clock signal together with time delay circuits, wherein one of the half-bridge circuits drives one pair of corresponding FETs and the other half-bridge circuit drives the other pair of corresponding FETs. The DC-AC converter includes: a Direct Current (DC) power source; a switching unit which includes a plurality of Field Effect Transistors (FETs) for changing paths of Direct Current (DC), so as to convert the DC to Alternating Current (AC); a transformer for transforming a voltage input from the switching unit; a load unit connected to the transformer; and a signal control unit for simultaneous parallel control of the FETs in the switching unit.

13 Claims, 6 Drawing Sheets

DC-AC CONVERTER

CROSS-REFERENCE TO RELATED APPLICATIONS

This application claims priority to and the benefit of Korean Patent Application No. 10-2006-0001515 filed in the Korean Intellectual Property Office on Jan. 5, 2006, the entire contents of which are incorporated herein by reference.

FIELD OF THE INVENTION

The present invention relates to a Direct Current to Alternating Current (DC-AC) converter, and more particularly to a DC-AC converter employing a parallel operation scheme, which has two half-bridge circuits using an input feedback signal and an input clock signal together with time delay circuits, wherein one of the half-bridge circuits drives one pair of corresponding FETs and the other half-bridge circuit drives the other pair of corresponding FETs.

BACKGROUND OF THE INVENTION

As generally known in the art, a Cold Cathode Fluorescent Lamp (CCFL) has various advantages including low power consumption, small heat radiation, high luminance, long lifespan, etc. because it can be operated by low current. The CCFL is now widely used as a backlight of a Liquid Crystal Display (LCD). A high Alternating Current (AC) voltage of 1 to 2 KV is necessary in order to turn on such a CCFL, and a DC-AC converter is usually used in order to provide such a high AC voltage.

FIG. 1 illustrates a circuit of a conventional DC-AC converter.

As shown, the conventional DC-AC converter includes a transformer TX1, a Direct Current (DC) power source 21', a bias/reference voltage generator 23' for generating bias and reference voltages necessary for internal operation from the DC power source 21', a switching unit 28' including four Field Effect Transistors (FETs) from switch A to switch D for providing current paths within the transformer TX1 by switching the voltage V1 according to driving signals, an LCD panel 22' including a CCFL operated by the transformer TX1, a protection circuit unit 26' for detecting an output voltage OVP and providing a sweeping stop signal when the detected output voltage exceeds a reference voltage, a frequency sweeper 27' for generating a rectangular pulse of 50% duty-cycle by performing frequency sweeping until the output voltage OVP exceeds the reference voltage before the step signal is input from the protection circuit unit 26' in an open lamp state, a feedback control unit 24' for comparing the feedback voltage from the protection circuit unit 26' with the reference voltage and controlling a switch-on time of the switching unit based on a result of the comparison, and a driving circuit unit 25' for providing a driving signal to the switching unit 28' according to the rectangular pulse of the frequency sweeper 27' and a switch-on time control signal of the feedback control unit 24'.

The protection circuit unit 26' includes a comparator 26A', a timer 26B', and an electric current sensor 26C'. The comparator 26A' determines if the lamp is open or not by comparing the CMP signal and a voltage signal from the LCD panel 22' with the reference signal and provides a stop signal to the frequency sweeper 27'. The timer 26B' has a time out period set in advance and is started when the detected voltage exceeds the reference voltage. When the timer has been operated during the time out period, the comparator 26A' provides the stop signal. The electric current sensor 26C' controls the frequency sweeper 27'.

U.S. Pat. No. 6,259,615 discloses a detailed example of such a DC-AC converter as described above.

The conventional DC-AC converter having the construction as described above employs a phase-shift scheme, i.e. a serial operation scheme, according to which a pair of switches including switch A and switch B are first sequentially operated by using the signal from the frequency sweeper, and the other pair of switches including switch C and switch D are then sequentially operated by using the feedback signal thereof.

However, such a conventional DC-AC converter requires a complicated control method and uses a 50% pulse frequency sweeper. Therefore, the conventional DC-AC converter requires complicated design and high manufacturing costs.

Further, most manufacturers currently produce DC-AC converters employing the phase-shift scheme or similar schemes, which thus have a high possibility of patent conflict occurring between them. Therefore, there is a need for a DC-AC converter, which can be controlled by a simple control method, can be designed in a simple manner, and is inexpensive to manufacture, while avoiding patent conflicts.

SUMMARY OF THE INVENTION

Accordingly, the present invention has been made to solve the above-mentioned problems occurring in the prior art, and an object of the present invention is to provide a DC-AC converter employing a parallel operation scheme, which has two half-bridge circuits using an input feedback signal and an input clock signal together with time delay circuits, wherein one of the half-bridge circuits drives one pair of corresponding FETs and the other half-bridge circuit drives the other pair of corresponding FETs.

In order to accomplish this object, there is provided a Direct Current to Alternating Current (DC-AC) converter including: a Direct Current (DC) power source; a switching unit which includes a plurality of Field Effect Transistors (FETs) for changing paths of Direct Current (DC), so as to convert the DC to Alternating Current (AC); a transformer for transforming a voltage input from the switching unit; a load unit connected to the transformer; and a signal control unit for simultaneous parallel control of the FETs in the switching unit.

The FETs in the switching unit may include a first P channel FET and a first N channel FET, which are interconnected in series and connected in parallel to the DC power source, and a second P channel FET and a second N channel FET, which are interconnected in series and connected in parallel to the DC power source.

The DC-AC converter may further include a feedback control unit connected between the switching unit and the load unit, so as to generate and output a predetermined signal by using a feedback signal from the load unit and a clock signal from the oscillator.

The signal control unit outputs four control signals by using the predetermined signal from the feedback control unit and the clock signal of the oscillator, so as to simultaneously control the first P channel FET, the first N channel FET, the second P channel FET, and the second N channel FET in parallel.

The DC-AC converter may further include a FET driver unit which includes a first driver and a second driver, wherein the first driver receives two control signals from the signal control unit and then outputs driving signals to the first P channel FET and the first N channel FET of the switching unit, and the second driver receives the other two control signals from the signal control unit and then outputs driving signals to the second P channel FET and the second N channel FET of the switching unit.

The transformer includes a first coil and a second coil, the first coil has one end connected to a line between the second P channel FET and the second N channel FET of the switching unit and has the other end connected to a line between the first P channel FET and the first N channel FET, and both ends of the second coil are connected to the load unit while one end of the second coil is connected to the second N channel FET of the switching unit.

The signal control unit forms a first current path through the first coil by turning on the first P channel FET P1 and the second N channel FET together during a predetermined time interval, and then forms a second current path through the first coil by turning on the second P channel FET and the first N channel FET together during a predetermined time interval, the first current path being opposite to the second current path.

The signal control unit controls a time interval for simultaneous turning-on of both the first P channel FET and the second N channel FET and a time interval for simultaneous turning-on of both the second P channel FET and the first N channel FET based on a reference signal from the feedback control unit.

The signal control unit includes a first half-bridge circuit for controlling the first P channel FET and the first N channel FET and a second half-bridge circuit for controlling the second P channel FET and the second N channel FET.

In order to control the first P channel FET, the signal control unit may include: a toggle switch to which a clock signal of the oscillator is input; a first AND gate to which the reference signal output from the feedback control unit and the clock signal output from the toggle switch are inputs; a time delay unit which delays a signal from the first AND gate for a predetermined time interval and then outputs a delayed signal; a first inverter for inverting a signal from the time delay unit and outputting an inverted signal; a second AND gate to which a signal from the first AND gate and the inverted signal from the first inverter are inputs; and a second inverter to which a signal from the second AND gate is input.

In order to control the first N channel FET, the signal control unit may include: a toggle switch to which a clock signal of the oscillator is input; a first AND gate to which the reference signal output from the feedback control unit and the clock signal output from the toggle switch are inputs; a first inverter for inverting a signal from the first AND gate and outputting an inverted signal; a time delay unit which delays a signal from the first inverter for a predetermined time interval and then outputs a delayed signal; a second inverter for inverting a signal from the time delay unit and outputting an inverted signal; a second AND gate to which the inverted signal from the first inverter and the inverted signal from the second inverter are inputs; a third inverter to which a signal from the second AND gate is input; and a fourth inverter to which a signal from the third AND gate is input.

In order to control the second P channel FET, the signal control unit may include: a toggle switch to which a clock signal of the oscillator is input; a first inverter to which a signal output from the toggle switch is input; a first AND gate to which the reference signal output from the feedback control unit and a signal output from the first inverter are inputs; a time delay unit which delays a signal from the first AND gate for a predetermined time interval and then outputs a delayed signal; a second inverter for inverting a signal from the time delay unit and outputting an inverted signal; a second AND gate to which a signal from the first AND gate and a signal from the second inverter are inputs; and a third inverter to which a signal from the second AND gate is input.

In order to control the second N channel FET, the signal control unit may include: a toggle switch to which a clock signal of the oscillator is input; a first inverter to which a signal output from the toggle switch is input; a first AND gate to which the reference signal output from the feedback control unit and a signal output from the first inverter are inputs; a second inverter for inverting and outputting a signal from the first AND gate; a time delay unit which delays a signal from the second inverter for a predetermined time interval and then outputs a delayed signal; a third inverter for inverting a signal from the time delay unit and outputting an inverted signal; a second AND gate to which a signal from the second inverter and a signal from the third inverter are inputs; a fourth inverter to which a signal from the second AND gate is input; and a fifth inverter to which a signal from the fourth inverter is input.

The time delay unit may include: a P channel FET, a gate voltage of which is controlled by an input signal; a static current source connected to a drain of the P channel FET; a comparator having an inverting node connected to a line between the P channel FET and the static current source and a non-inverting node connected to a reference voltage source; and a capacitor connected to a line between a grounding node and the non-inverting node of the comparator.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Figure 1:
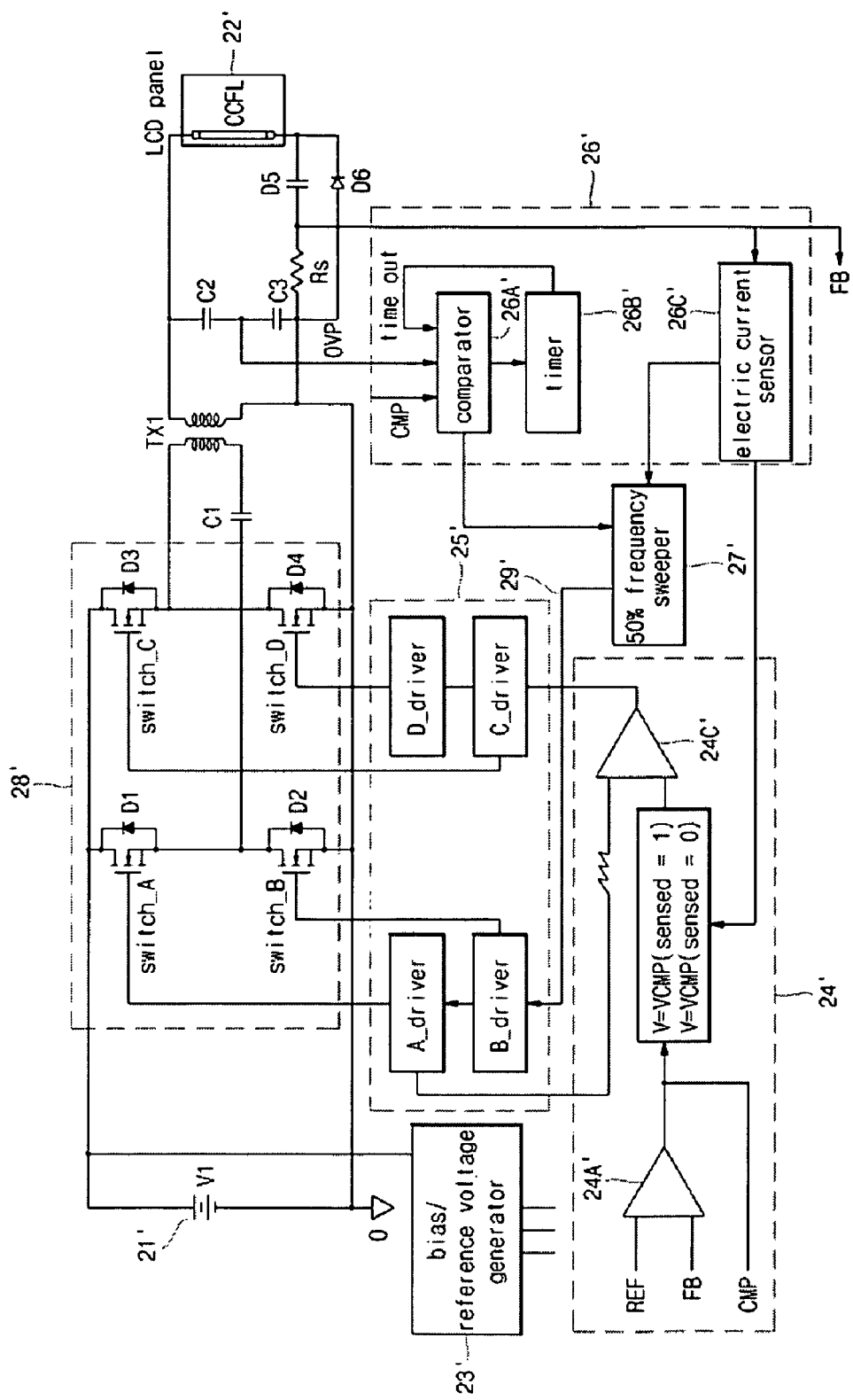
FIG. 1 is a circuit diagram illustrating a conventional DC-AC converter.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2A:
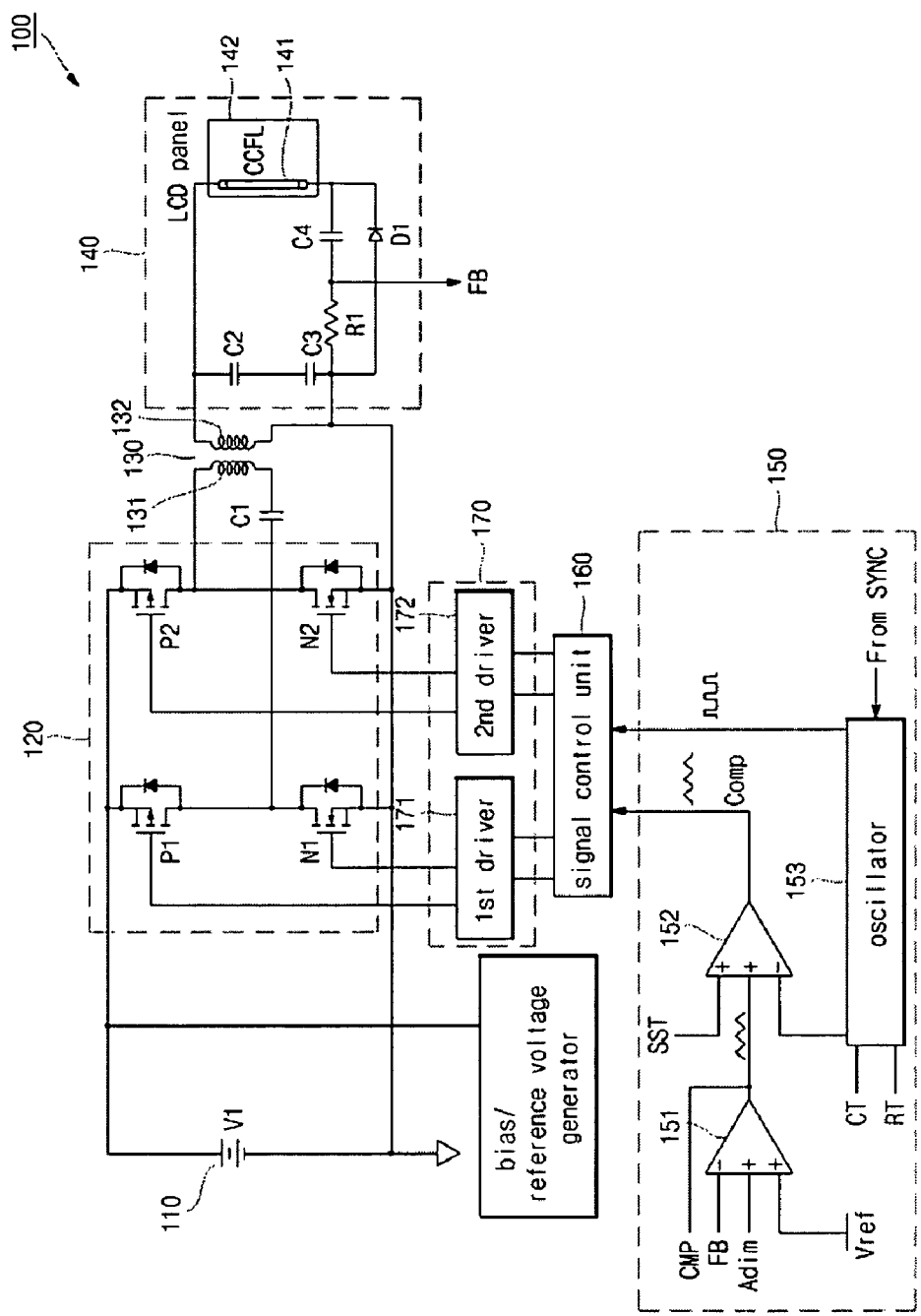
FIG. 2*a* is a block diagram illustrating a DC-AC converter according to the present invention.
Figure 2B:
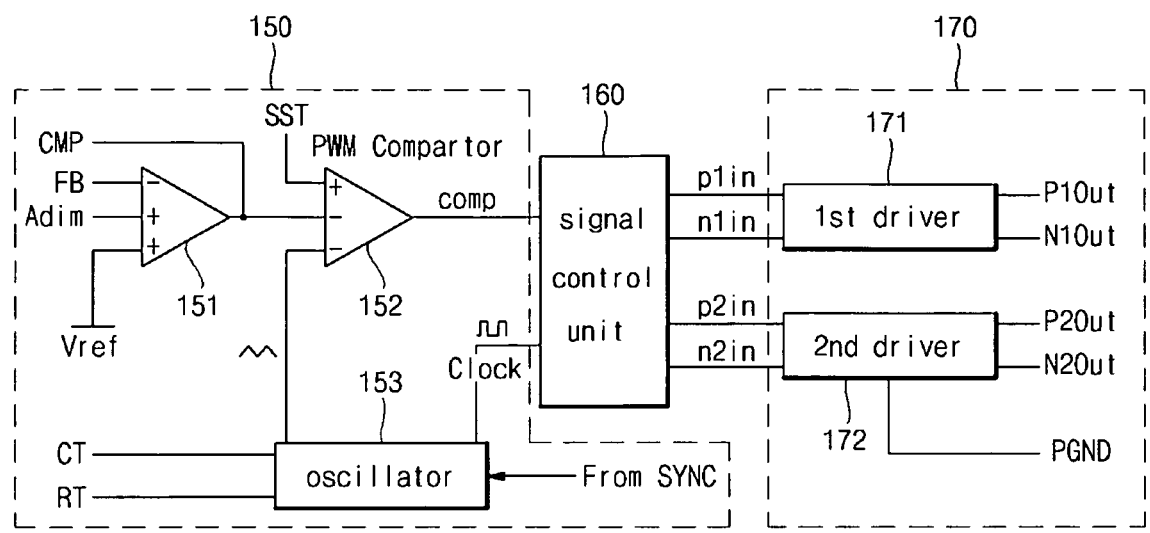
FIG. 2*b* is a block diagram illustrating a feedback control unit, a signal control unit, and an FET driver in the DC-AC converter of FIG. 2*a;*

FIG. 2*a* is a block diagram illustrating a DC-AC converter according to one advantageous embodiment of the present invention, and FIG. 2*b* is a block diagram illustrating a feedback control unit, a signal control unit, and an FET driver in the DC-AC converter of FIG. 2*a*.

As shown, the DC-AC converter 100 according to one advantageous embodiment of the present invention includes a DC power source 110, a switching unit 120, a transformer 130, a load unit 140, a feedback control unit 150, a signal control unit 160, and an FET driver unit 170.

The DC power source 110 outputs a predetermined DC voltage V1.

The switching unit 120 may include four FETs. In the switching unit 120, a first P channel EFT P1 and a first N channel FET N1 are connected in series to each other, while a source of the first P channel EFT P1 is connected to a plus node of the DC power source 110 and a source of the first N channel EFT N1 is connected to a minus node of the DC power source 110. Further, a second P channel EFT P2 and a second N channel FET N2 are connected in series to each other, while a source of the second P channel EFT P2 is connected to the first P channel FET P1 and a source of the second N channel EFT N2 is connected to the first N channel FET N1. Moreover, both of the first P channel FET P1 and the second P channel FET P2 have a body diode in a direction from drain to source, and both of the first N channel FET N1 and the second N channel FET N2 has a forward body diode in a direction from source to drain.

The transformer 130 may include a first coil 131 and a second coil 132. The first coil 131 has one end connected to the line between the second P channel FET P2 and the second N channel FET N2 of the switching unit 120 and has the other end connected through a capacitor C1 to the line between the first P channel FET P1 and the first N channel FET N1. Further, both ends of the second coil 132 are connected to the load unit 140, while one end of the second coil 132 is connected to the source of the second N channel FET N2.

The load unit 140 is connected in parallel to the second coil 132 of the transformer 130. The load unit 140 includes a CCFL 141 mounted in an LCD panel 142. Further, the load unit 140 includes capacitors C2, C3 and C4, a resistor R1, and a diode D1, to which the construction of the invention is not limited, though. It is possible to obtain the feedback signal FB of the load unit 140 from the line between the resistor R1 and the capacitor C4.

The feedback control unit 150 includes an error amplifier 151, a comparator 152, and an oscillator 153. The feedback signal FB from the load unit 140 is input to the inverting node of the error amplifier 151, and the reference voltage is applied to a non-inverting node of the error amplifier 151. Further, a signal CMP from the error amplifier 151 is input to a non-inverting node of the comparator 152, and a clock signal of the oscillator 153 is input to an inverting node of the comparator 152. In addition, a signal Comp from the comparator 152 together with the clock signal of the oscillator 153 is output to the signal control unit 160.

The signal control unit 160 receives two signals from the feedback control unit 150, which include the signal Comp output from the comparator 152 and the clock signal from the oscillator 153, and outputs predetermined control signals p1in, n1in, p2in, and n2in for parallel control of the four FETs in the switching unit 120.

Specifically, by the control signals p1in, n1in, p2in, and n2in output from the signal control unit 160, both the second P channel FET P2 and the first N channel FET N1 are turned on together so as to form a first current path through the first coil 131 during a predetermined time interval, and both the first P channel FET P1 and the second N channel FET N2 are turned on together so as to form a second current path (which is opposite to the first current path) through the first coil 131 during a predetermined time interval. It goes without saying that the first P channel FET P1 and the first N channel FET N1 are not simultaneously turned on by the signal control unit 160. Also, the second P channel FET P2 and the second N channel FET N2 are not simultaneously turned on by the signal control unit 160, either.

Further, the signal control unit 160 can change the electric power supplied to the load unit 140 by controlling the time interval for the turning-on of both the second P channel FET P2 and the first N channel FET N1 and the time interval for the turning-on of both the first P channel FET P1 and the second N channel FET N2 based on the signal from the feedback control unit 150, specifically, based on the feedback signal from the load unit 140.

The FET driver unit 170 includes a first driver 171 and a second driver 172. The first driver 171 receives two control signals p1 in and n1 in from the signal control unit 160, and then drives the first P channel FET P1 and the first N channel FET N1 of the switching unit 120. The second driver 172 receives the other two control signals p2in and n2in from the signal control unit 160, and then drives the second P channel FET P2 and the second N channel FET N2 of the switching unit 120. Specifically, the first driver 171 outputs signals P1Out and N1Out, and the second driver 172 outputs signals P2Out and N2Out.

Figure 3:
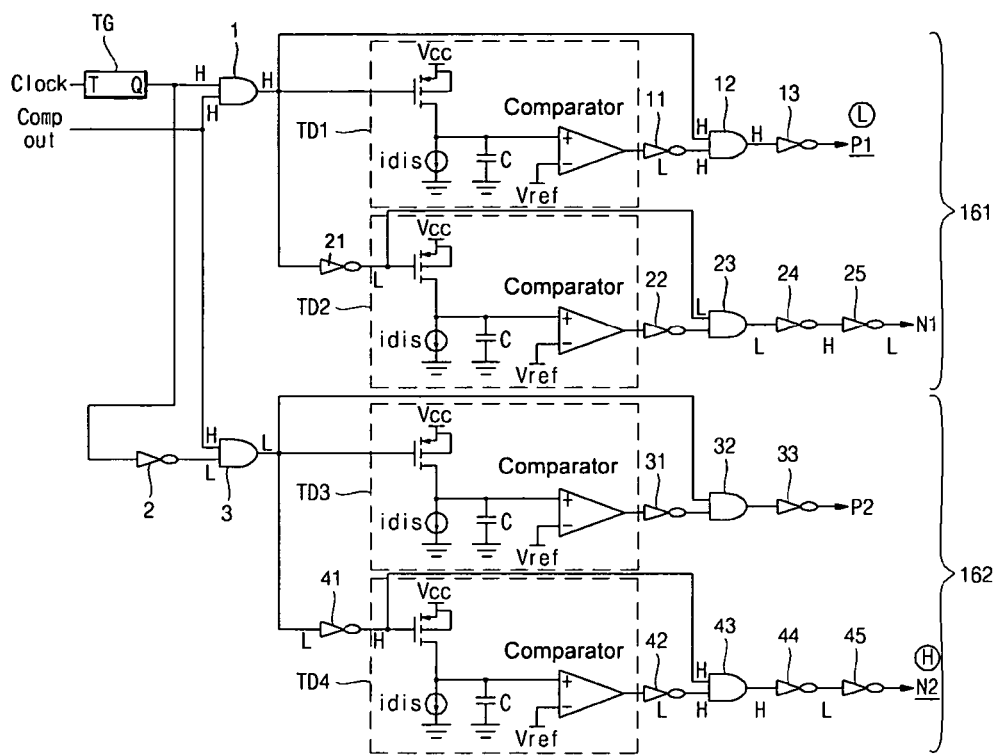
FIG. 3 is a circuit diagram of a logic circuit for a signal control unit of a DC-AC converter according to an embodiment of the present invention.

FIG. 3 is a circuit diagram of a logic circuit for a signal control unit of a DC-AC converter according to an embodiment of the present invention.

As shown, the signal control unit 160 according to the present invention includes a first half-bridge circuit 161 for control of the first P channel FET P1 and the first N channel FET N1 and a second half-bridge circuit 162 for control of the second P channel FET P2 and the second N channel FET N2. The first half-bridge circuit 161 and the second half-bridge circuit 162 simultaneously operate, so that the four FETs are simultaneously controlled according to a parallel operation scheme instead of the phase-shift scheme (serial operation scheme).

The first half-bridge circuit 161 includes logic circuits for controlling the first P channel FET P1, which include a toggle switch TG to which a clock signal of the oscillator 153 is input, a first AND gate 1 to which the signal Comp output from the feedback control unit 150 and a signal output from the toggle switch TG are inputs, a time delay unit TD1 which delays a signal from the first AND gate 1 for a predetermined time interval and then outputs the delayed signal, a first inverter 11 for inverting a signal from the time delay unit TD1 and outputting the inverted signal, a second AND gate 12 to which a signal from the first AND gate 1 and a signal from the first inverter 11 are inputs, and a second inverter 13 to which a signal from the second AND gate 12 is input.

Figure 4A:
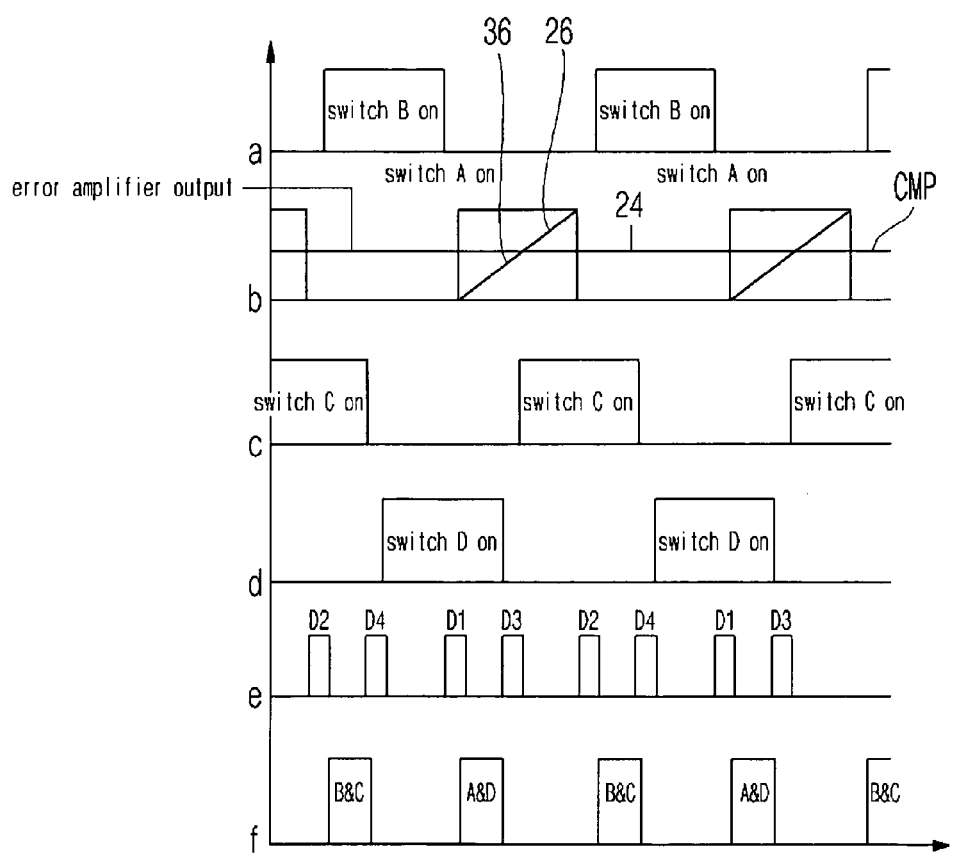
FIG. 4*a* illustrates waveforms of signals by each FET of a conventional DC-AC converter.
Figure 4B:
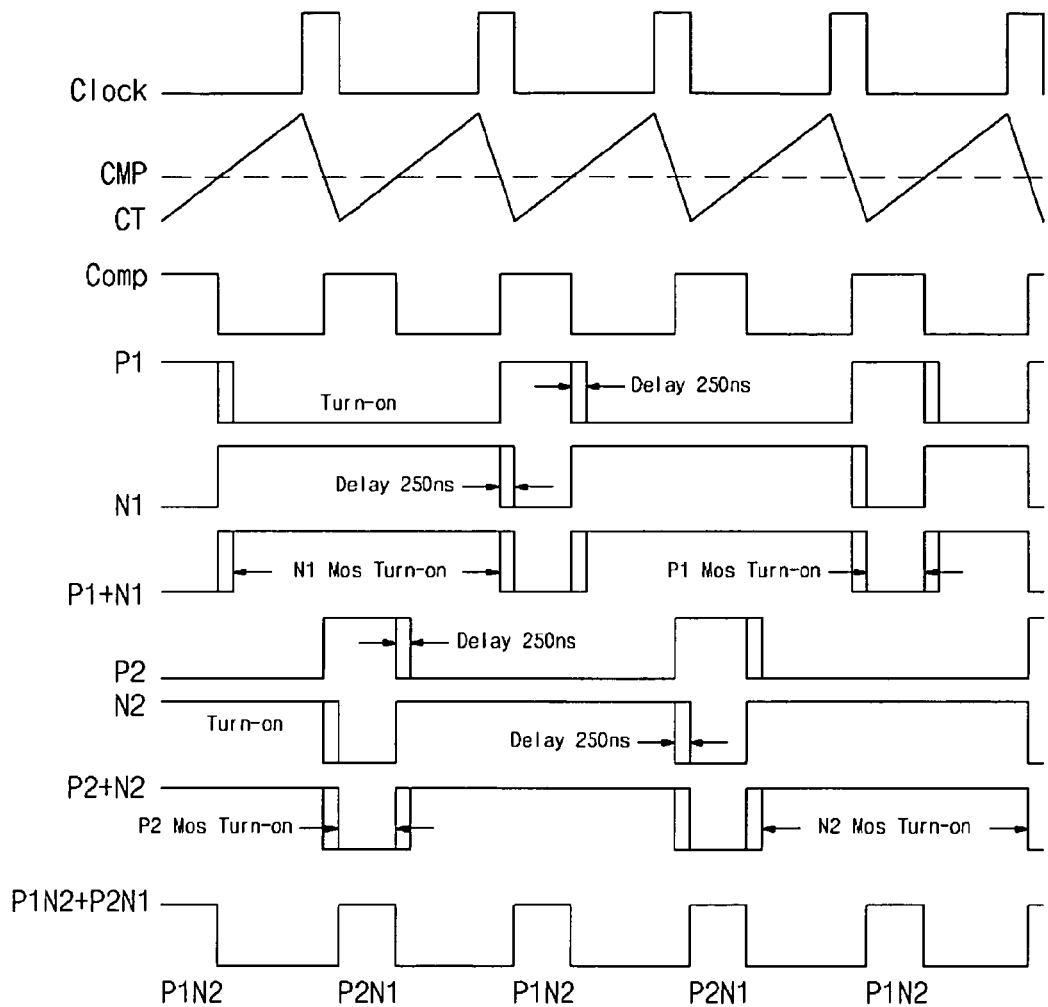
FIG. 4*b* illustrates waveforms of signals by each FET of a DC-AC converter according to an embodiment of the present invention.

FIG. 4b illustrates waveforms of signals which include the signal CMP output from the error amplifier 151 by the feedback signal in the feedback control unit 150, the signal CT input to the oscillator 153 and the comparator 152, the signal Comp output from the comparator 152 and then input to the signal control unit 160, and the clock signal Clock output from the oscillator 153 and then input to the signal control unit 160.

Further, it is noted from FIG. 4b that, in the logic circuit for controlling the first P channel FET P1, the signal output from the time delay unit TD1 shows a delay of a predetermined time interval when it shifts down from the high state to the low state (see P1 waveform).

The first half-bridge circuit 161 further includes logic circuits for controlling the first N channel FET N1, which include a toggle switch TG to which a clock signal of the oscillator 153 is input, a first AND gate 1 to which the signal Comp output from the feedback control unit 150 and a signal output from the toggle switch TG are inputs, a first inverter 21 for inverting and outputting the signal from the first AND gate 1, a time delay unit TD2 which delays a signal from the first inverter 21 for a predetermined time interval and then outputs the delayed signal, a second inverter 22 for inverting a signal from the time delay unit TD2 and outputting the inverted signal, a second AND gate 23 to which a signal from the first AND gate 1 and a signal from the second inverter 22 are inputs, a third inverter 24 to which a signal from the second AND gate 23 is input, and a fourth inverter 25 to which a signal from the third inverter 24 is input.

It is noted from FIG. 4b that, in the logic circuit for controlling the first N channel FET N1, the signal output from the time delay unit TD2 shows a delay of a predetermined time interval when it shifts down from the high state to the low state (see N1 waveform).

As noted from the above description, in the first half-bridge circuit 161, the first N channel FET N1 is turned on during a relatively long time period while the first P channel FET P1 is turned on during a relatively short time period which does not overlap with the relatively long time period for the turning-on of the first N channel FET N1 (see waveform of P1+N1).

The second half-bridge circuit 162 includes logic circuits for controlling the second P channel FET P2, which include a toggle switch TG to which a clock signal of the oscillator 153 is input, a first inverter 2 to which a signal output from the toggle switch TG is input, a first AND gate 3 to which the signal Comp output from the feedback control unit 150 and a signal output from the first inverter 2 are inputs, a time delay unit TD3 which delays a signal from the first AND gate 3 for a predetermined time interval and then outputs the delayed signal, a second inverter 31 for inverting a signal from the time delay unit TD3 and outputting the inverted signal, a second AND gate 32 to which a signal from the first AND gate 3 and a signal from the second inverter 31 are inputs, and a third inverter 33 to which a signal from the second AND gate 32 is input.

Also, it is noted from FIG. 4b that, in the logic circuit for controlling the second P channel FET P2, the signal output from the time delay unit TD3 shows a delay of a predetermined time interval when it shifts down from the high state to the low state (see P2 waveform).

The second half-bridge circuit 162 further includes logic circuits for controlling the second N channel FET N2, which include a toggle switch TG to which a clock signal of the oscillator 153 is input, the first inverter 2 to which a signal from the toggle switch TG is input, a first AND gate 3 to which the signal Comp output from the feedback control unit 150 and a signal output from the first inverter 2 are inputs, a second inverter 41 for inverting and outputting the signal from the first AND gate 3, a time delay unit TD4 which delays a signal from the second inverter 41 for a predetermined time interval and then outputs the delayed signal, a third inverter 42 for inverting a signal from the time delay unit TD4 and outputting the inverted signal, a second AND gate 43 to which a signal from the second inverter 41 and a signal from the third inverter 42 are inputs, a fourth inverter 44 to which a signal from the second AND gate 43 is input, and a fifth inverter 45 to which a signal from the fourth inverter 44 is input.

It is also noted from FIG. 4b that, in the logic circuit for controlling the second N channel FET N2, the signal output from the time delay unit TD4 shows a delay of a predetermined time interval when it shifts down from the high state to the low state (see N2 waveform).

As noted from the above description, in the second half-bridge circuit 162, the second N channel FET N2 is turned on during a relatively long time period while the second P channel FET P2 is turned on during a relatively short time period which does not overlap with the relatively long time period for the turning-on of the second N channel FET N2 (see waveform of P2+N2).

As noted from the waveform of P1N2+P2N1, by the first half-bridge circuit 161 and the second half-bridge circuit 162 as described above, both the first P channel FET P1 and the second N channel FET N2 are simultaneously turned on during a predetermined time interval, and both the second P channel FET P2 and the first N channel FET N1 are then simultaneously turned on during a predetermined time interval. Of course, such turning on and off is repeated in an alternating manner.

Therefore, it is noted that the waveform of P1N2+P2N1 shown in FIG. 4b is equal to the waveform f of FIG. 4a, that is, the waveform of B&C and A&D, which is a waveform of the prior art. That is, the waveform finally obtained by the present invention is the same as that of the prior art. Further, it is noted that the turning on time of the FET serves as a power control means to determine the electric power.

However, as described above, the signal control unit 160 according to the present invention includes two half-bridge circuits 161 and 162, wherein the first half-bridge circuit 161 controls the first P channel FET P1 and the first N channel FET N1 and the second half-bridge circuit 162 controls the second P channel FET P2 and the second N channel FET N2. That is, in controlling four FETs, the present invention employs a parallel operation scheme instead of the phase shift scheme or the serial operation scheme, which is used in the prior art. Therefore, the present invention simplifies the control scheme and reduces the number of elements.

Further, according to the present invention, as in the prior art, the feedback signal FB from the load unit 140 causes a change in the signal CMP from the error amplifier 151 of the feedback control unit 150, which results in change of the time for simultaneous turning-on of the first P channel FET P1 and the second N channel FET N2 and the time for simultaneous turning-on of the second P channel FET P2 and the first N channel FET N1, thereby controlling the output power through the transformer 130.

Further, each of the time delay units TD1, TD2, TD3, and TD4 includes a P channel FET, a gate voltage of which is controlled by an input signal, a static current source connected to a drain of the P channel FET, a comparator having an inverting node connected to a line between the P channel FET and the static current source and a non-inverting node connected to a reference voltage source, and a capacitor connected to a line between a grounding node and the non-inverting node of the comparator. Therefore, the delay time by each of the time delay units TD1, TD2, TD3, and TD4 is determined by the capacitance of the capacitor in each of the time delay units TD1, TD2, TD3, and TD4, so that it is possible to determine the time delay in the actual output waveform by controlling the capacitance of the capacitor in each of the time delay units TD1, TD2, TD3, and TD4.

In the DC-AC converter according to the present invention as described above, the switching unit includes first and second P channel FETs and first and second N channel FETs, wherein one of two drivers controls the first P channel FET and the first N channel FET and the other of the two drivers controls the first P channel FET and the first N channel FET, while both of the two drivers are controlled in parallel by one signal control unit.

That is, according to the present invention, one half-bridge controls one pair of corresponding FETs, and another half-bridge controls another pair of corresponding FETs.

In other words, the present invention controls a plurality of FETs according to a parallel control scheme instead of a serial control scheme. Therefore, the present invention does not require circuits including a 50% frequency sweeper, which are indispensable in the prior art.

Therefore, the present invention provides a DC-AC converter which employs a simplified control scheme and includes simplified elements while having the same efficiency as that of a conventional DC-AC converter.

Further, the present invention avoids any possible patent conflict with current phase shift type converters manufactured by many converter providers.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A Direct Current to Alternating Current (DC-AC) converter comprising:
    a Direct Current (DC) power source;
    a switching unit which includes a plurality of Field Effect Transistors (FETs) for changing paths of Direct Current (DC), so as to convert the DC to Alternating Current (AC);
    a transformer for transforming a voltage input from the switching unit;
    a load unit connected to the transformer; and
    a signal control unit for simultaneously parallel control of the FETs in the switching unit;
    wherein the FETs in the switching unit include a first P channel FET and a first N channel FET, which are interconnected in series and connected in parallel to the DC power source, and a second P channel FET and a second N channel FET, which are interconnected in series and connected in parallel to the DC power source;
    further comprising a feedback control unit connected between the switching unit and the load unit, so as to generate and output a predetermined signal by using a feedback signal from the load unit and a clock signal from an oscillator;
    wherein the signal control unit outputs four control signals by using the predetermined signal from the feedback control unit and the clock signal of the oscillator, so as to simultaneously control the first P channel FET, the first N channel FET, the second P channel FET, and the second N channel FET in parallel;
    wherein, in order to control the first P channel FET, the signal control unit comprises:
    a toggle switch to which a clock signal of the oscillator is input;
    a first AND gate to which the reference signal output from the feedback control unit and the clock signal output from the toggle switch are inputs;
    a time delay unit which delays a signal from the first AND gate for a predetermined time interval and then outputs a delayed signal;
    a first inverter for inverting a signal from the time delay unit and outputting an inverted signal;
    a second AND gate to which a signal from the first AND gate and the inverted signal from the first inverter are inputs; and
    a second inverter to which a signal from the second AND gate is input.

2. The DC-AC converter as claimed in claim 1, further comprising a FET driver unit which includes a first driver and a second driver, wherein the first driver receives two control signals from the signal control unit and then outputs driving signals to the first P channel FET and the first N channel FET of the switching unit, and the second driver receives the other two control signals from the signal control unit and then outputs driving signals to the second P channel FET and the second N channel FET of the switching unit.

3. The DC-AC converter as claimed in claim 2, wherein the transformer includes a first coil and a second coil, the first coil has one end connected to a line between the second P channel FET and the second N channel FET of the switching unit and has the other end connected to a line between the first P channel FET and the first N channel FET, and both ends of the second coil are connected to the load unit while one end of the second coil is connected to the second N channel FET of the switching unit.

4. The DC-AC converter as claimed in claim 3, wherein the signal control unit forms a first current path through the first coil by turning on the first P channel FET P1 and the second N channel FET together during a predetermined time interval, and then forms a second current path through the first coil by turning on the second P channel FET and the first N channel FET together during a predetermined time interval, the first current path being opposite to the second current path.

5. The DC-AC converter as claimed in claim 4, wherein the signal control unit controls a time interval for simultaneous turning-on of both the first P channel FET and the second N channel FET and a time interval for simultaneous turning-on of both the second P channel FET and the first N channel FET based on a reference signal from the feedback control unit.

6. The DC-AC converter as claimed in claim 4, wherein the signal control unit comprises a first half-bridge circuit for controlling the first P channel FET and the first N channel FET and a second half-bridge circuit for controlling the second P channel FET and the second N channel FET.

7. The DC-AC converter as claimed in claim 1, wherein the time delay unit comprises:
    a P channel FET, a gate voltage of which is controlled by an input signal;
    a static current source connected to a drain of the P channel FET;
    a comparator having an inverting node connected to a line between the P channel FET and the static current source and a non-inverting node connected to a reference voltage source; and
    a capacitor connected to a line between a grounding node and the non-inverting node of the comparator.

8. A Direct Current to Alternating Current (DC-AC) converter comprising:
    a Direct Current (DC) power source;
    a switching unit which includes a plurality of Field Effect Transistors (FETs) for changing paths of Direct Current (DC), so as to convert the DC to Alternating Current (AC);
    a transformer for transforming a voltage input from the switching unit;
    a load unit connected to the transformer;
    a signal control unit for simultaneously parallel control of the FETs in the switching unit;
    wherein the FETs in the switching unit include a first P channel FET and a first N channel FET, which are interconnected in series and connected in parallel to the DC power source, and a second P channel FET and a second N channel FET, which are interconnected in series and connected in parallel to the DC power source;
    further comprising a feedback control unit connected between the switching unit and the load unit, so as to generate and output a predetermined signal by using a feedback signal from the load unit and a clock signal from an oscillator;

wherein the signal control unit outputs four control signals by using the predetermined signal from the feedback control unit and the clock signal of the oscillator, so as to simultaneously control the first P channel FET, the first N channel FET, the second P channel FET, and the second N channel FET in parallel;

wherein, in order to control the first N channel FET, the signal control unit comprises:

a toggle switch to which a clock signal of the oscillator is input;

a first AND gate to which the reference signal output from the feedback control unit and the clock signal output from the toggle switch are inputs;

a first inverter for inverting a signal from the first AND gate and outputting an inverted signal;

a time delay unit which delays a signal from the first inverter for a predetermined time interval and then outputs a delayed signal;

a second inverter for inverting a signal from the time delay unit and outputting an inverted signal;

a second AND gate to which the inverted signal from the first inverter and the inverted signal from the second inverter are inputs;

a third inverter to which a signal from the second AND gate is input; and a fourth inverter to which a signal from the third inverter is input.

9. The DC-AC converter as claimed in claim 8, wherein the time delay unit comprises:

a P channel FET, a gate voltage of which is controlled by an input signal;

a static current source connected to a drain of the P channel FET;

a comparator having an inverting node connected to a line between the P channel FET and the static current source and a non-inverting node connected to a reference voltage source; and a capacitor connected to a line between a grounding node and the non-inverting node of the comparator.

10. A Direct Current to Alternating Current (DC-AC) converter comprising:

a Direct Current (DC) power source;

a switching unit which includes a plurality of Field Effect Transistors (FETs) for changing paths of Direct Current (DC), so as to convert the DC to Alternating Current (AC);

a transformer for transforming a voltage input from the switch mg unit;

a load unit connected to the transformer;

a signal control unit for simultaneously parallel control of the FETs in the switching unit;

wherein the FETs in the switching unit include a first P channel FET and a first N channel FET, which are interconnected in series and connected in parallel to the DC power source, and a second P channel FET and a second N channel FET, which are interconnected in series and connected in parallel to the DC power source;

further comprising a feedback control unit connected between the switching unit and the load unit, so as to generate and output a predetermined signal by using a feedback signal from the load unit and a clock signal from an oscillator;

wherein the signal control unit outputs four control signals by using the predetermined signal from the feedback control unit and the clock signal of the oscillator, so as to simultaneously control the first P channel FET, the first N channel FET, the second P channel FET, and the second N channel FET in parallel;

wherein, in order to control the second P channel FET, the signal control unit comprises:

a toggle switch to which a clock signal of the oscillator is input;

a first inverter to which a signal output from the toggle switch is input;

a first AND gate to which the reference signal output from the feedback control unit and a signal output from the first inverter are inputs;

a time delay unit which delays a signal from the first AND gate for a predetermined time interval and then outputs a delayed signal;

a second inverter for inverting a signal from the time delay unit and outputting an inverted signal;

a second AND gate to which a signal from the first AND gate and a signal from the second inverter are inputs; and a third inverter to which a signal from the second AND gate is input.

11. The DC-AC converter as claimed in claim 10, wherein the time delay unit comprises:

a P channel FET, a gate voltage of which is controlled by an input signal;

a static current source connected to a drain of the P channel FET;

a comparator having an inverting node connected to a line between the P channel FET and the static current source and a non-inverting node connected to a reference voltage source; and a capacitor connected to a line between a grounding node and the non-inverting node of the comparator.

12. A Direct Current to Alternating Current (DC-AC) converter comprising:

a Direct Current (DC) power source;

a switching unit which includes a plurality of Field Effect Transistors (FETs) for changing paths of Direct Current (DC), so as to convert the DC to Alternating Current (AC);

a transformer for transforming a voltage input from the switching unit;

a load unit connected to the transformer;

a signal control unit for simultaneously parallel control of the FETs in the switching unit;

wherein the FETs in the switching unit include a first P channel FET and a first N channel FET, which are interconnected in series and connected in parallel to the DC power source, and a second P channel FET and a second N channel FET, which are interconnected in series and connected in parallel to the DC power source;

further comprising a feedback control unit connected between the switching unit and the load unit, so as to generate and output a predetermined signal by using a feedback signal from the load unit and a clock signal from an oscillator;

wherein the signal control unit outputs four control signals by using the predetermined signal from the feedback control unit and the clock signal of the oscillator, so as to simultaneously control the first P channel FET, the first N channel FET, the second P channel FET, and the second N channel FET in parallel;

wherein, in order to control the second N channel FET, the signal control unit comprises:

a toggle switch to which a clock signal of the oscillator is input;

a first inverter to which a signal output from the toggle switch is input;

a first AND gate to which the reference signal output from the feedback control unit and a signal output from the first inverter are inputs;

a second inverter for inverting and outputting a signal from the first AND gate;

a time delay unit which delays a signal from the second inverter for a predetermined time interval and then outputs a delayed signal;

a third inverter for inverting a signal from the time delay unit and outputting an inverted signal;

a second AND gate to which a signal from the second inverter and a signal from the third inverter are inputs;

a fourth inverter to which a signal from the second AND gate is input; and a fifth inverter to which a signal from the fourth inverter is input.

13. The DC-AC converter as claimed in claim 12, wherein the time delay unit comprises:

a P channel FET, a gate voltage of which is controlled by an input signal;

a static current source connected to a drain of the P channel FET;

a comparator having an inverting node connected to a line between the P channel FET and the static current source and a non-inverting node connected to a reference voltage source; and a capacitor connected to a line between a grounding node and the non-inverting node of the comparator.

* * * * *